J. C. THOMSON.
DOUGHNUT MAKING MACHINE.
APPLICATION FILED FEB. 6, 1920.

1,340,805.

Patented May 18, 1920.
3 SHEETS—SHEET 1.

INVENTOR
J. C. Thomson.
BY
Fred J. Dieterich
ATTORNEYS

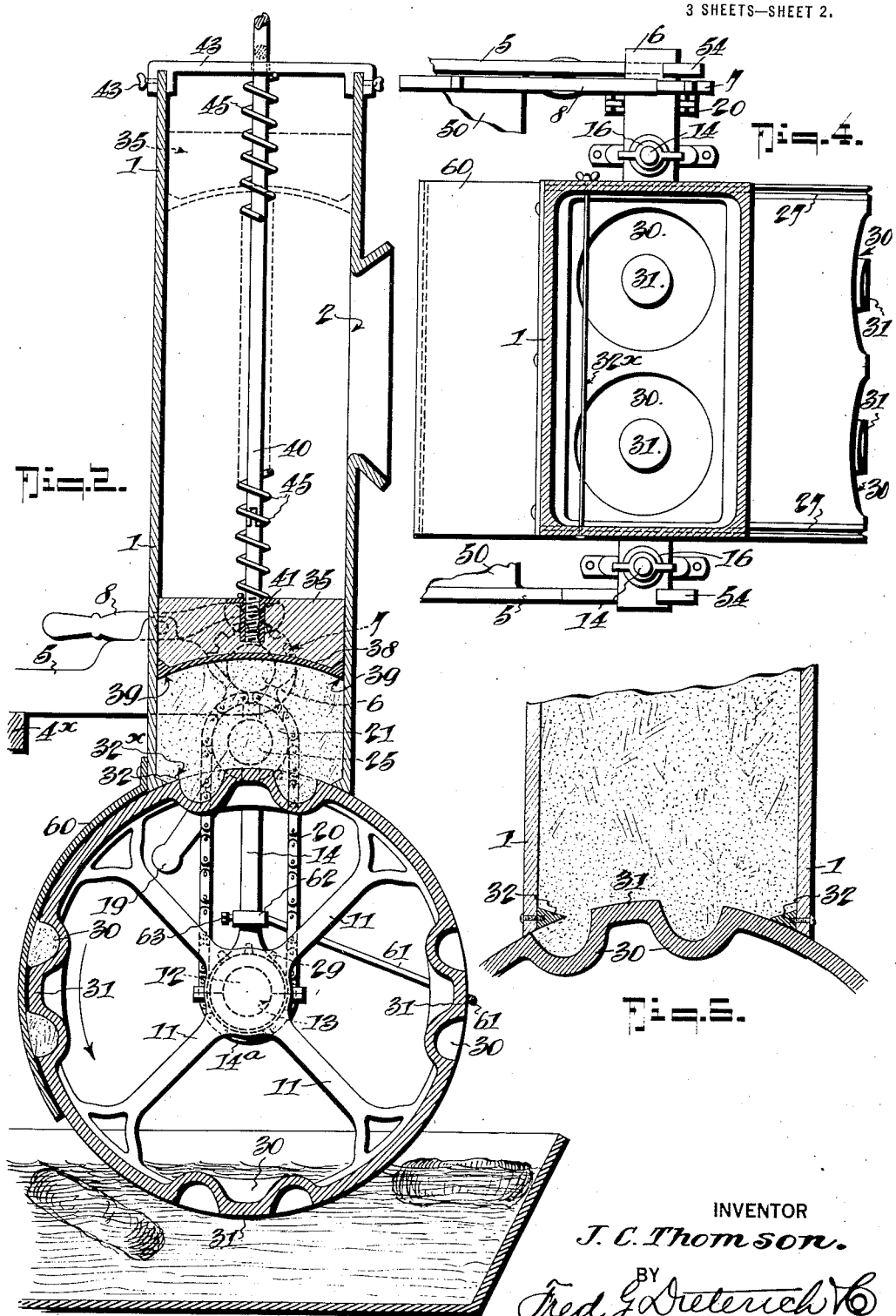

J. C. THOMSON.
DOUGHNUT MAKING MACHINE.
APPLICATION FILED FEB. 6, 1920.
1,340,805.
Patented May 18, 1920.
3 SHEETS—SHEET 3.
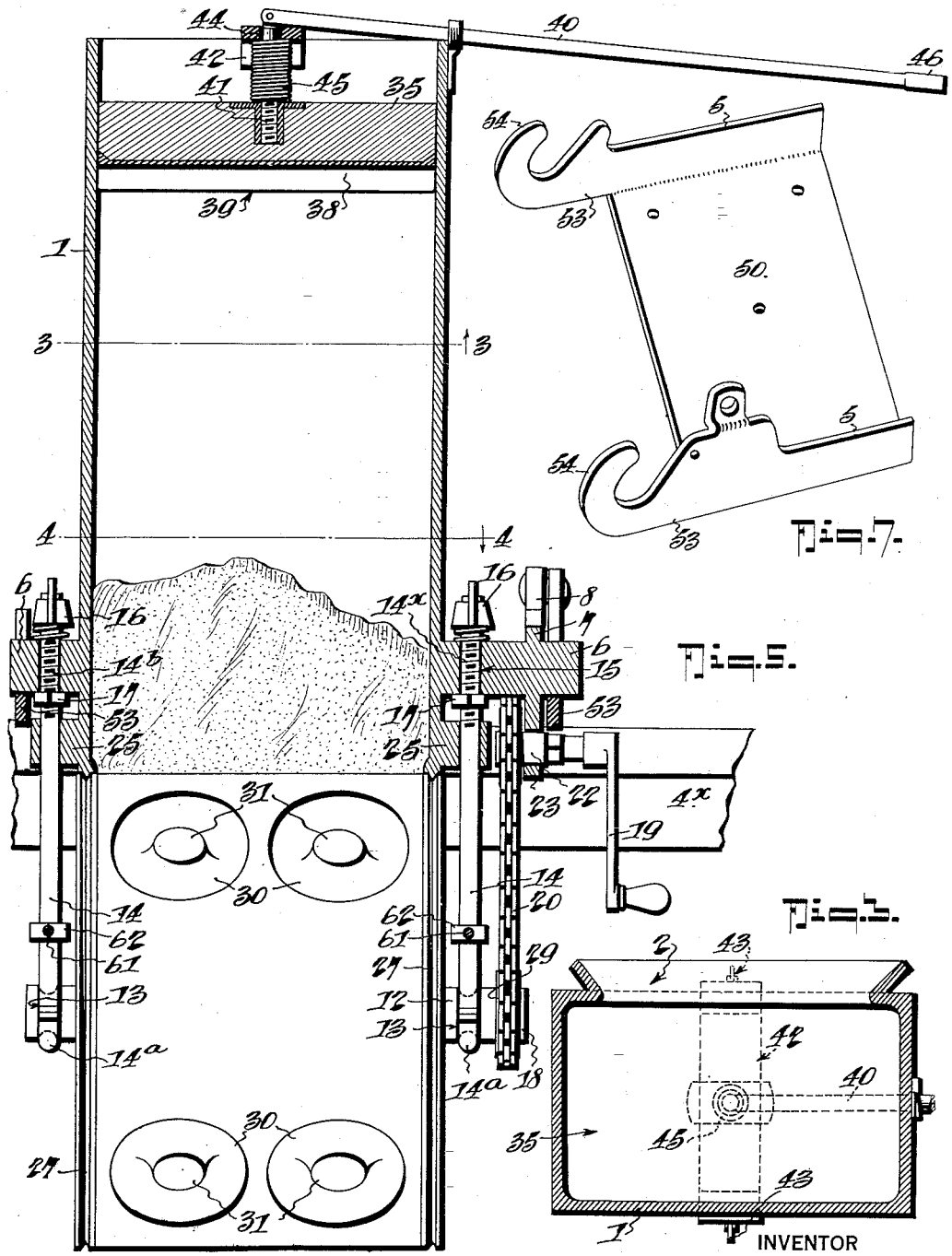
INVENTOR
J. C. Thomson.
BY
Fred G. Dieterich
ATTORNEYS

UNITED STATES PATENT OFFICE.

JOHN C. THOMSON, OF CHICAGO, ILLINOIS.

DOUGHNUT-MAKING MACHINE.

1,340,805.  Specification of Letters Patent.  Patented May 18, 1920.

Application filed February 6, 1920. Serial No. 356,762.

*To all whom it may concern:*

Be it known that I, JOHN C. THOMSON, a citizen of the United States, residing at Chicago, in the county of Cook and State of Illinois, have invented a new and useful Doughnut-Making Machine, of which the following is a specification.

My invention primarily has for its purpose to provide a new and useful machine that is more especially adapted for making doughnuts and other like cakes or cookies and which is particularly designed as a window attraction and an ornament to up-to-date stores or bakeries, which also combines sanitation, utility, economy in construction and use and is of high efficiency in operation.

Another object of my invention is the provision of a machine for making doughnuts and the like of uniform shape and weight, adapted for being conveniently worked by a single operator in a simple and expeditious manner and which may be enlarged to any capacity without detriment to its efficiency, Again, my invention seeks to provide a machine for the general purposes stated in which the parts are so assembled and coöperatively arranged whereby the features of molding, greasing the mold and placing the molded article in the grease tank are effected under one operation.

Another and essential object of my invention lies in the provision of a machine for making doughnuts that constitutes a combined store window advertisement and profitable business proposition.

With the above and other objects in view and which will be fully apparent, as the nature of my invention is the better understood, from the following detail description thereof, as specifically stated in the appended claims and as illustrated in the accompanying drawings, in which:

Fig. 2 is a vertical cross section thereof taken substantially on the line 2—2 on Fig. 1.

Fig. 3 is a horizontal section thereof on the line 3—3 on Fig. 5.

Fig. 4 is a similar view taken on the line 4—4 of Fig. 5, the drum portion and the drum scraping knives being shown in plan view.

Fig. 5 is a longitudinal section of the complete doughnut forming mechanism, parts being in elevation, the grease tank being omitted and the dough plunger or compressor shown at the lifted position above the inlets to the dough receiving and plunger holding compartment.

Fig. 6 is an enlarged detail section of a portion of the mold drum, the coöperating lower end of the dough holder and the plunger or compresser devices.

Fig. 7 is a detail perspective view of the table bracket.

Figure 1:
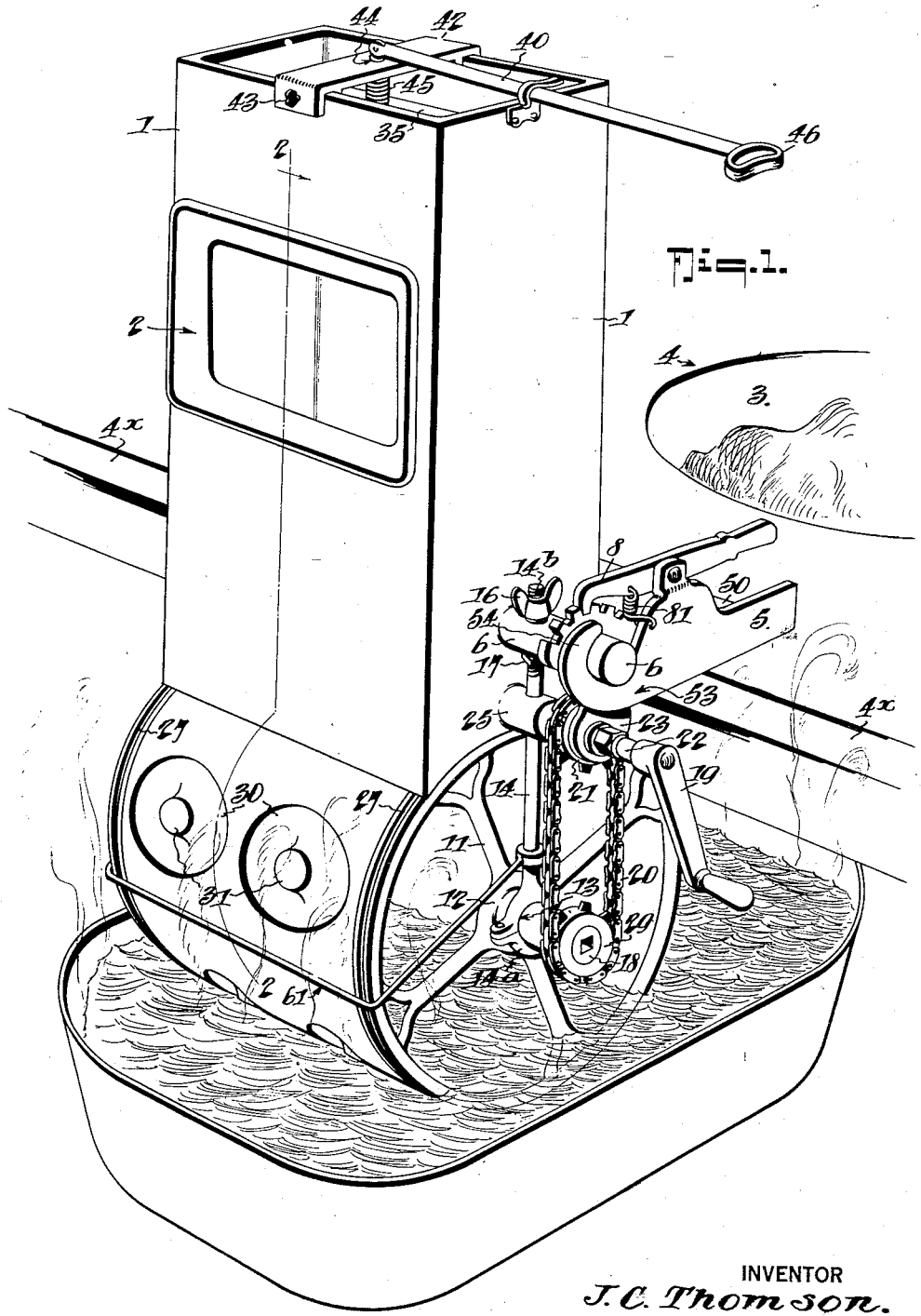
Figure 1 is a perspective view of my doughnut making machine, the same being shown in operative condition.

Briefly stated, my doughnut making machine embodies, generally, a dough receiving compartment or holder, a molding drum supported at the lower end of and which coöperates with the dough holder and which is provided with dough forming cavities or molds in the peripheral face thereof, into which the dough is fed from the holder by a spring impelled compressor or plunger as the mold cavities travel across the lower or discharging end of the said dough holder.

Means is also included in my complete construction of doughnut making machine, for holding the dough forms or cakes in place as they are being lowered into the grease tank and for ejecting the partially cooked articles as they are elevated out of the grease to fall back into the grease, as the mold cavities move back into position for being recharged with dough from the dough holder.

Means is also provided for suspending the mold or forming drum and the power or driving mechanism from the dough holder and for conveniently mounting the holder and its pendently sustained parts, as a whole, upon a table edge and for tilting the entire machine in inclined positions relatively to the table as conditions may make desirable.

Referring now to the details of construction, 1 designates what I term the dough receptacle, which, in practice, is preferably formed of cast metal and the same is vertically elongated and of rectangular shape in horizontal section, the said receptacle being open at the top and bottom and formed with its corners rounded as is clearly shown in Fig. 3.

At one side the holder or receptacle 1 is formed with an opening 2 for the insertion therethrough of dough which, in the practical arrangement of my machine, is preferably taken from a dough bowl 3 set in a suitable seat opening 4 in the table top 4× adjacent the table edge, as shown in Fig. 1.

By referring now more particularly to the aforesaid Fig. 1, it will be noticed the dough holder 1 is pivotally hung between a pair of hanger brackets 5—5, bent up at right angles from a horizontal portion 50 secured by screws or otherwise to the edge of the table top, and the said bracket members include outward projections 53, the purpose of which will presently appear.

The lower end of each projection 53 terminates in a claw 54 and the said claws 54, of the brackets, constitute bearings for stud journals 6—6 that are cast with or otherwise fixedly secured to the dough receptacle and which extend from the opposite ends of the said receptacle, as shown.

The said parts 53—53 and 6—6 constitute the fulcrum bearings that support the entire mechanism in an upright position and also provide for conveniently swinging the said mechanism on an angle relatively to the table edge, when in operative position.

For holding the machine at its desired tilted adjustments, one of the lateral studs 6 has a semi-circular rack 7 with which engages a latch pawl 8 that is pivotally mounted on the adjacent bracket member 53 and which is constantly held for interlocking with the rack 7 by a pull spring 81, it being understood that, when it is desired to tilt the entire machine, relatively to the table and the grease tank, into which the formed doughnuts are dropped as hereinafter stated, it is only necessary to push the upper end of the pawl 8 down to release it from the rack 7 and thereby allow the studs 6—6 to rock freely in their claw-like bearings 54—54, as shown, and at this point, it should be stated, the studs 6—6 also serve as hangers from which the doughnut forming drum and the parts that operate therewith are suspended.

The mold or forming drum, the peculiar construction of which is best shown in Figs. 2 and 5, comprises spider-like ends, the spokes 11—11 of which merge with hubs 12, each of which has an annular groove 13 for receiving the lower looped ends 14ª of a pair of hangers 14, one of which is suspended through each stud journal 6.

To provide for proper adjustment of the hangers 14 and consequent mounting of the doughnut forming drum with respect to the lower or outlet end of the dough receptacle, the upper end of each hanger 14 is threaded as at 14ᵇ and each of the threaded ends of the hangers pass through a passage 15 in their respective journal studs 6 and they are adjusted to their desired vertical positions by winged nuts 16 and held to their adjustments by the said nuts 16 and jam nuts 17 that engage the said threaded hanger ends, as shown.

One of the drum hubs 12 has a spindle-like extension 18 that is adapted for receiving the socket of a crank handle 19, when my machine is especially adapted for being operated by hand.

The hub 12 last referred to, may, in practice, be also provided with a sprocket gear 29 for receiving an endless sprocket chain 20 that passes up over another gear 21 that is secured on a short shaft 22 journaled in a pendent extension 23 on the rack segment 7.

The shaft 22 may also have a belt pulley adapted for receiving the driving belt, when the machine is to be a power driven one.

25—25 designate lugs, one of which projects from each end of the receptacle 1 and through which the upright or hanger members 14 pass, the said lugs 25 serving to stabilize and hold the drum in proper relation to the dough receptacle 1.

Each spider end of the drum has an annular groove 27 and, in practice, the periphery of the drum is adjusted sufficiently close to the lower edges of the receptacle ends to receive rim or lug members formed on the said lower receptacle edges and thereby sustain the receptacle 1 and the drum in proper alinement and the drum from endwise displacement relatively to the dough holder or receptacle 1.

The drum also includes an annular or circumferential wall in which are located the doughnut forming molds 30, a transversely disposed pair of the molds 30 being disposed on each quarter of the drum.

In practice, when my machine is designed for making doughnuts, as shown, the molds are circular and preferably three inches in diameter and each mold has a solid center 31 for forming the opening in the doughnut and which center, to facilitate the dropping off of the partially cooked doughnut, tapers from a one inch diameter at the base to a three-fourths of an inch diameter at the top.

As is clearly shown in Fig. 2, the bottom of the dough receptacle is curved to snugly engage the periphery of the drum and each pair of transversely disposed molds 30 extend approximately across the full length of the dough chamber, only sufficient space being left at each end of the chamber for the utilization of the dough severing wire 32× and the knife edges 32, which latter may be cast with the lower edges of the front and back walls of the receptacle or they may be as separate members secured to the said lower receptacle edges, as indicated in Fig. 6. The severing wire 32× and the knife edges 32 serve to clean and scrape the periphery of the drum.

35 designate a combined compressor and plunger that has the horizontal shape of the dough compartment and snugly fits within the said compartment for resting over the entire top surface of the dough that is fed into the receptacle through the said opening 2 thereof, as hereinbefore stated.

To provide for a clean clearance of the dough as the combined plunger and compressor travels down the dough chamber, during the operation of filling the molds in the drum, the bottom of the plunger-compressor is concaved and is covered by a convexed metal plate 38, the edges of which are formed into knife-like portions 39 that operate to shear or scrape the dough from the walls of the dough chamber.

By providing the outer edges of the plunger-compressor with knife-like members and the lower edges of the front and back walls of the dough chamber as stated and shown, the dough in the chamber is cleaned from the walls thereof, as the plunger descends and the knives at the front and back lower edge of the receptacle operate to cut the dough and clear the drum as the dough follows the molds.

In my construction of doughnut making machine, the plunger is constantly held to act as a compressor for forcing the dough downwardly toward the mold face of the drum.

Any suitable means for constantly holding the plunger under downward compression may be used.

In my present showing, the plunger receives the lower threaded end 41 of a steel rod 40, the upper end of which passes through a cross clamp 42 whose opposite ends have bifurcations for slipping over the top edge of the front and back members of the receptacle to which they may be rigidly secured by set screws 43—43.

Centrally, the clamp 42 has an aperture 44 through which the upper end of the rod 40 is guided and moved freely.

45 designates a piano wire spring that takes around the rod 40 with the upper end resting against the clamp 42 and the lower end against the plunger 35, it being understood the tension of the spring tends, at all times, to press the plunger and the dough downwardly in a substantially solid bulk against the mold face of the drum.

When assembling the parts, the plunger 35 is placed into the top of the receptacle 1 before the clamp member 42 is put into position.

In practice, the plunger lifting rod 40 has a handle 46 for conveniently pulling the said rod and the attached plunger upward and for holding the said plunger to the elevated position above the dough feed opening in the receptacle 1, suitable means is provided for sustaining it at the said elevated position, which means may be as indicated in Fig. 1 or any other device capable of maintaining the spring 45 under compression.

60 designates an apron that conforms to the drum and fits over the rear face of the said frame. This apron serves to hold the dough cakes into the molds until they pass down and reach the grease tank.

61 designates a U-shaped stout wire bail that extends across the upgoing or front face of the drum and its purpose is to engage and release such partially cooked cakes as may adhere to the mold as they lift out of the grease and cause them to drop back therein.

For affecting adjustment of the trip device, the side arms thereof include cups 62 that slidably engage the hangers 14 and upon which they may be sustained at the desired heights for a set screw 63, as shown.

In my construction of doughnut making machine, since the bottom of the mold drum is constantly projected down into the hot grease and since the annular wall of the drum is made of thin material, the dough cake is partially fried, as it passes through the grease while on the mold and falls out of the mold and back into the grease as it rises to the surface of the grease, the separation of the dough cake from the mold being made positive, since by reason of the molding device running through the cooking liquid, it is thoroughly greased. The walls of the dough receptacle 1, in practice, are finished perfectly true and smooth and the plunger-compressor is fitted to work as smoothly and as closely as the piston of an engine.

From the foregoing description taken in connection with the accompanying drawings, the complete construction, the manner of its use and the many advantages of my invention will be readily apparent to those familiar with the handling of dough cake making machines.

The parts are coöperatively and so compactly assembled that they can be economically made, and connected so that they take up a relatively small space and are adapted for being easily manipulated.

With my machine, the molding of the cake, the greasing of the mold, and the placing of the doughnuts into the grease tank is done in one operation, it being apparent that after working up a batch of dough sufficient to fill all of the molds on the drum and after the cakes have been formed and dropped into the grease tank, the machine may be readily tilted backward toward the horizontal position and held out of the way as a batch of fried doughnuts are removed from the tank, it being understood that while in the said tilted position, the receptacle may be refilled with dough and then quickly returned to its upright or operative position by simply dropping the rack and detent devices.

In the drawings I have also shown my machine as having a wire 32ˣ drawn across the dough holder just ahead of the cutting knives. This wire passes through the walls of the dough holder and is held tight by a thread and winged nut on one end thereof, as shown.

The wires 32 in the working of some kinds of dough may be omitted.

What I claim is:

1. In a machine of the character described, a grease container, a forming drum for depositing the formed article into the grease container and a charging receptacle for supplying the dough to the forming drum.

2. In a machine of the character described, a grease container, a forming drum for depositing the formed article into the grease container and a charging receptacle for supplying the dough to the forming drum, the said charging receptacle and the drum being tiltably sustained with respect to the grease container.

3. In a machine of the character described, a grease container, a forming drum for depositing the formed article into the grease container and a charging receptacle for supplying the dough to the forming drum, the said charging receptacle and the drum being tiltably sustained with respect to the grease container, and means for locking the said receptacle and drum at their tilted position.

4. In a machine of the character described, a grease container, a forming drum for depositing the formed article into the grease container and a charging receptacle for supplying the dough to the forming drum, and means for retaining the formed articles on the drum until they are lowered into the grease.

5. In a machine of the character described, a grease container, a forming drum for depositing the formed article into the grease container and a charging receptacle for supplying the dough to the forming drum, and means for retaining the formed articles on the drum until they are lowered into the grease, and other means for dislodging the formed articles from the drum to cause them to drop back into the grease container.

6. In a machine of the character described, a grease container, a forming drum for depositing the formed articles into the grease container, the said drum being supported with its lower portion extended into the grease in the container and a charging receptacle for supplying the dough to the forming drum.

7. In a machine of the character described, a forming drum, a vertically sustained dough receptacle open at the bottom, a combined plunger and compressor within the receptacle that tends to constantly force the dough through the open bottom end of the receptacle against the drum, means pendently supporting the drum with its peripheral face in contact with the open lower end of the receptacle.

8. In a machine of the character described, a vertically sustained dough receptacle open at the bottom, a combined plunger and compressor within the receptacle that tends to force the dough through the open bottom end of the receptacle, a forming drum, means pendently supporting the drum with its peripheral face in close contact with the open lower end of the receptacle, the said means consisting of hangers carried by the receptacle, each terminating in a bearing loop at the lower end, the drum having hub portions that rotatably engage the said hanger loops.

9. In a machine of the character described, a vertically sustained dough receptacle open at the bottom, a combined plunger and compressor within the receptacle that tends to force the dough through the open bottom end of the receptacle, a forming drum, means pendently supporting the drum with its peripheral face in close contact with the open lower end of the receptacle, the said means consisting of hangers carried by the receptacle, each terminating in a bearing loop at the lower end, the drum having hub portions that rotatably engage the said hanger loops, and further means for effecting vertical adjustment of the hanger means, whereby to effect a close fitting of the drum and the lower end of the dough receptacle.

10. In a machine of the character described, a vertically sustained dough receptacle open at the bottom, a combined plunger and compressor within the receptacle that tends to force the dough through the open bottom end of the receptacle, a forming drum, means pendently supporting the drum with its peripheral face in contact with the open lower end of the receptacle, and means for interlockably engaging the drum and the lower edge of the receptacle. whereby to hold the drum against lateral displacement.

11. In a machine of the character described, a dough receptacle open at the bottom, means for sustaining the receptacle in an upright position, means within the receptacle that constantly forces the dough through the open bottom of the receptacle, a forming drum pendently supported from the receptacle with its forming surface held to constantly move in contact with the dough forced through the lower open end of the receptacle.

12. In a machine of the character described, a dough receptacle open at the bottom, means for sustaining the receptacle in an upright position, means within the receptacle that constantly forces the dough through the open bottom of the receptacle, a forming drum pendently supported from the receptacle with its forming surface held to move in constant contact with the lower open end of the receptacle, the said receptacle sustaining means comprising a stud spindle on each end of the receptacle, and a supporting bracket having bearings for engaging the said spindles.

13. In a machine of the character described, a dough receptacle open at the bottom, means for sustaining the receptacle in an upright position, means within the receptacle that automatically forces the dough through the open bottom of the receptacle, a forming drum pendently supported from the receptacle with its forming surface held to move in close contact with the lower open end of the receptacle, the said receptacle sustaining means comprising a stud spindle on each end of the receptacle, and a supporting bracket having bearings for engaging the said spindles, and a lever and rack device that connects one of the brackets and its coöperative spindle for holding the receptacle and its pendently attached drum to tilted positions.

14. In a machine of the character described, a dough receptacle open at the bottom, means for sustaining the receptacle in an upright position, means within the receptacle that automatically forces the dough through the open bottom of the receptacle, a forming drum pendently supported from the receptacle with its forming surface held to move in close contact with the lower open end of the receptacle, the said receptacle sustaining means comprising a stud spindle on each end of the receptacle, and a supporting bracket having bearings for engaging the said spindles, and a lever and rack device that connects one of the brackets and its coöperative spindle for holding the receptacle and its pendently attached drum to tilted positions, and a chain drive and gear connection that joins with one of the spindles and the drum shaft.

15. In a machine of the character described, a vertically sustained dough receptacle open at the bottom, a combined plunger and compressor within the receptacle that tends to force the dough through the open bottom end of the receptacle, a forming drum, means pendently supporting the drum with its peripheral face in close contact with the bottom end of the receptacle, and means for cleaning the drum surface as the filled molds pass from under the receptacle and are advanced toward a cooking utensil.

16. In a machine of the character described, a dough receptacle open at the bottom and having a filling opening in one of its sides, means within the receptacle that automatically ejects the dough through the open bottom of the receptacle, devices coöperative with the said means and the receptacle for holding the said dough ejecting means above the dough filling opening in the receptacle, a forming drum pendently sustained from the receptacle with its forming face held to move in close relation with the open end of the said receptacle.

JOHN C. THOMSON.